United States Patent [19]

Huckert

[11] Patent Number: 5,293,849
[45] Date of Patent: Mar. 15, 1994

[54] CONTINUOUSLY ROTATING ENGINE APPARATUS

[76] Inventor: Louie N. Huckert, 1807 Cora La., Bakersfield, Calif. 93306

[21] Appl. No.: 981,084

[22] Filed: Nov. 24, 1992

[51] Int. Cl.$^5$ .............................................. F02B 53/04
[52] U.S. Cl. ..................................... 123/221; 418/207
[58] Field of Search ...................... 123/248, 249, 221; 418/195, 207

[56] References Cited

U.S. PATENT DOCUMENTS 1,618,360  2/1927  Wellman, Jr. ......................... 123/221
3,809,022  5/1974  Dean, Jr. ............................... 418/207

FOREIGN PATENT DOCUMENTS 0286200  1/1991  Fed. Rep. of Germany ...... 418/207

*Primary Examiner*—Richard A. Bertsch
*Assistant Examiner*—Charles G. Freay
*Attorney, Agent, or Firm*—Leon Gilden

[57] ABSTRACT

An internal combustion engine includes a unitary housing, having a first cylindrical housing medially and orthogonally intersecting a second cylindrical housing, with the first cylindrical housing including a first gear ring rotatably mounted therewithin, with the second cylindrical housing having a second gear ring mounted therewith, wherein the first gear ring is arranged for simultaneous rotation in communication relative to one another, with the first gear ring having a plurality of spaced piston plates, with the second gear ring including a plurality of spaced chamber plates, wherein the piston plate and the chamber plate are arranged for simultaneous positioning within an associated combustion chamber to effect projection of the piston plate upon combustion within the combustion chamber.

3 Claims, 4 Drawing Sheets

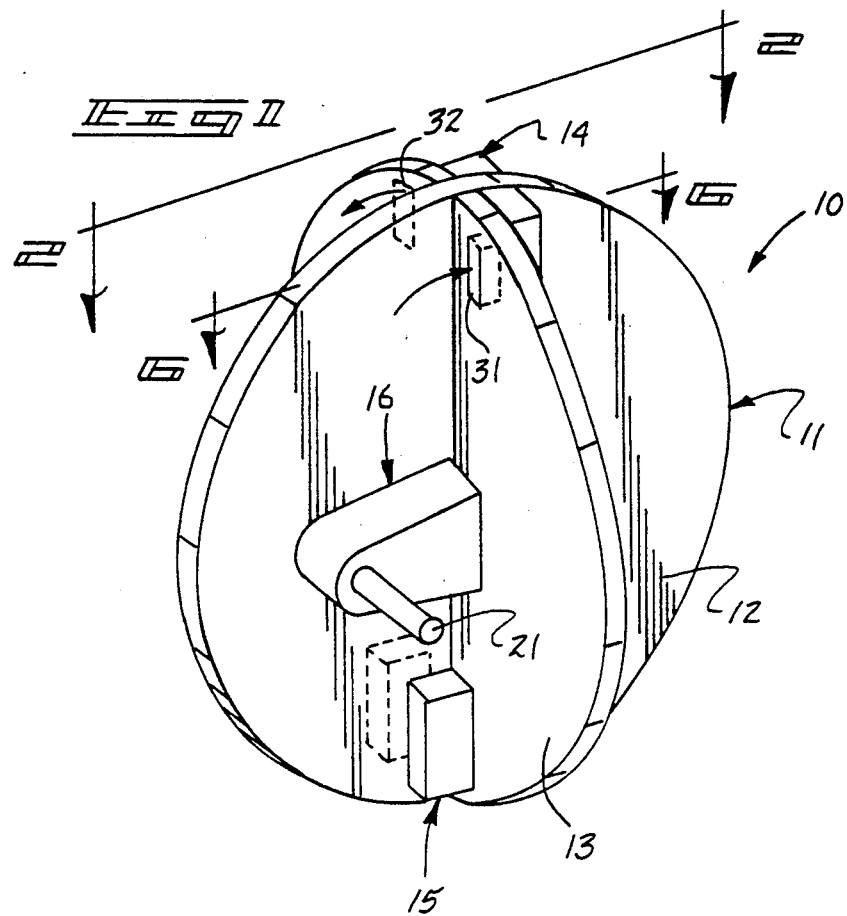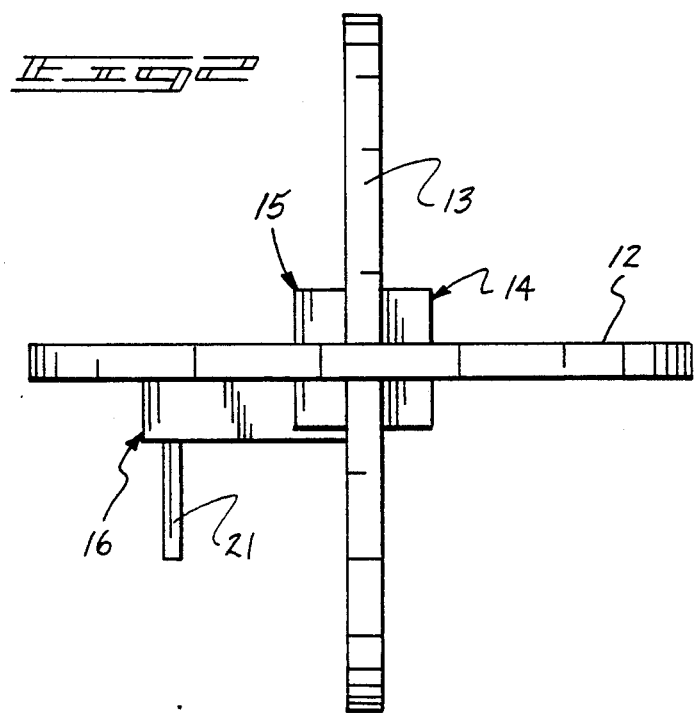

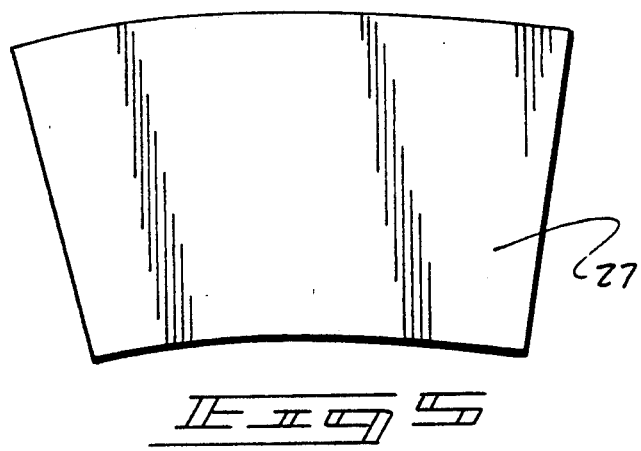
FIG 5
FIG 6
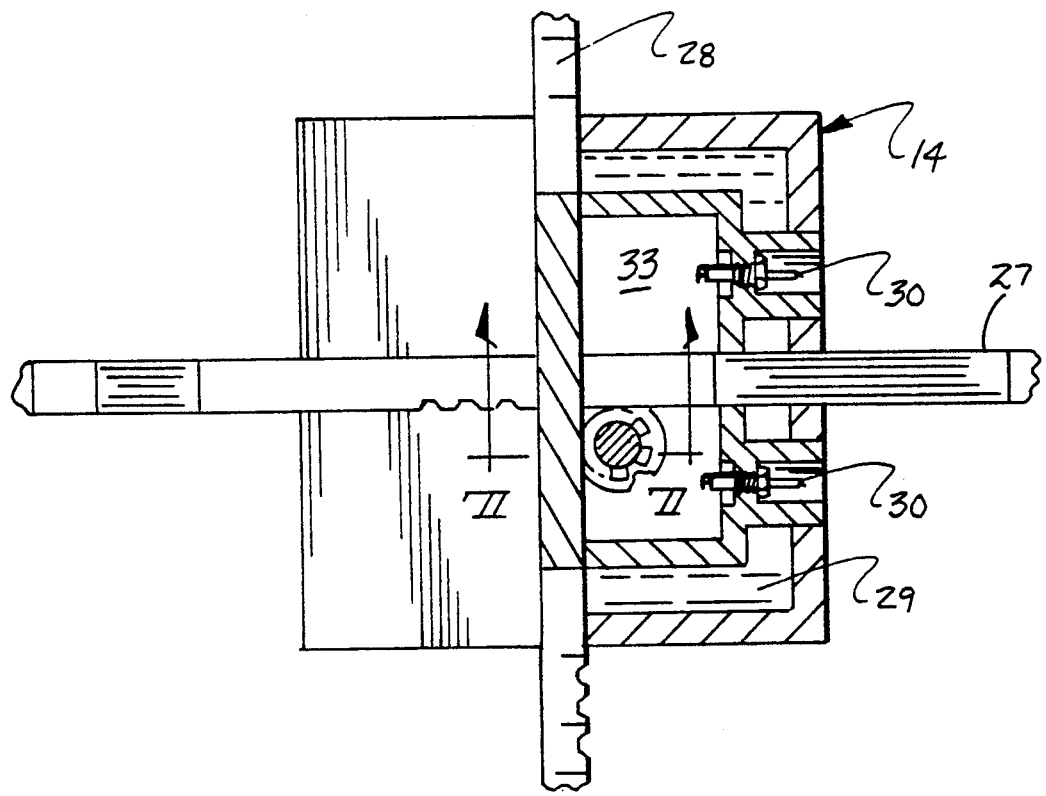

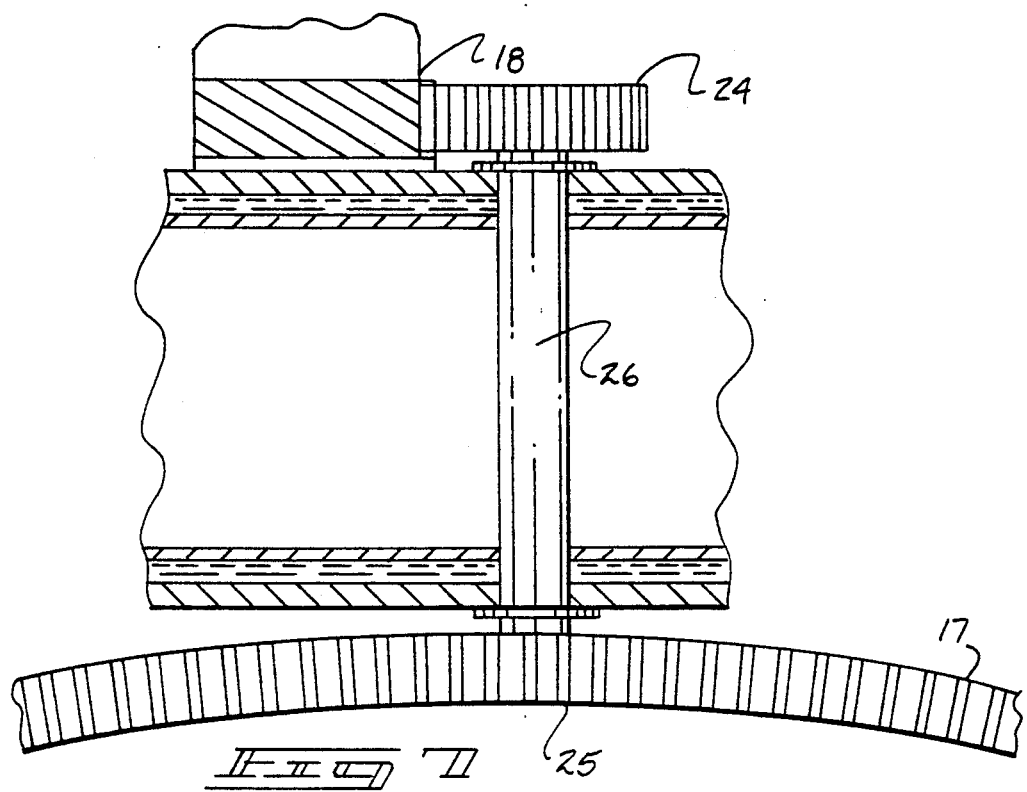
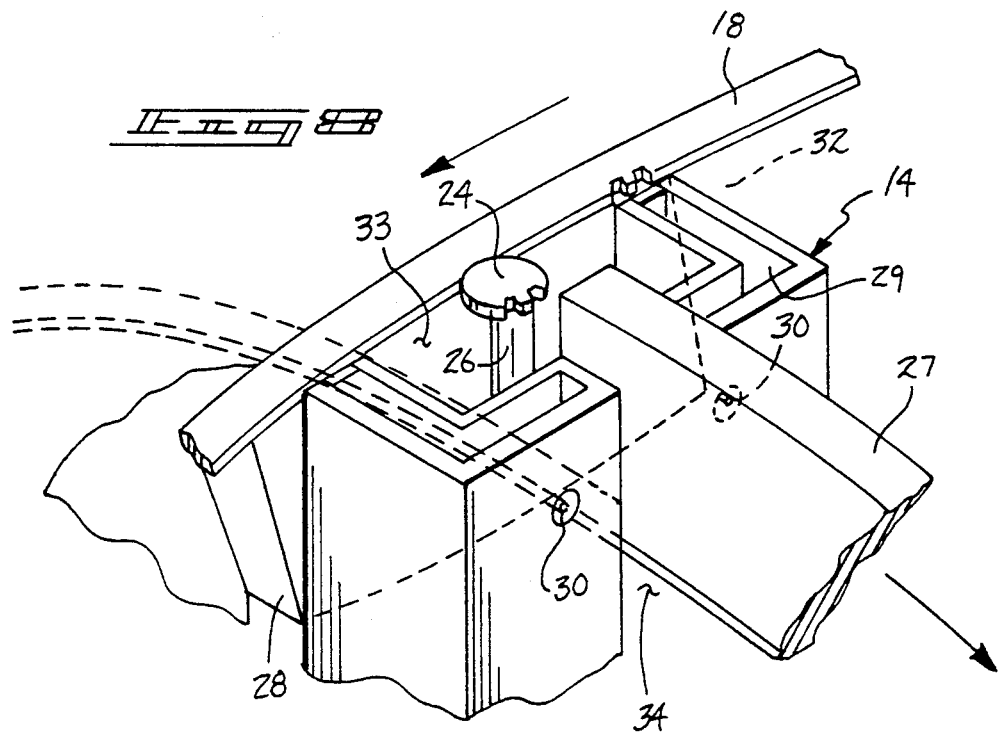

CONTINUOUSLY ROTATING ENGINE APPARATUS

BACKGROUND OF THE INVENTION

1. Field of the Invention

The field of invention relates to internal combustion engine structure, and more particularly pertains to a new and improved continuously rotating engine apparatus wherein the same utilizes gear rings arranged for simultaneous rotation relative to one another to effect firing and production of energy.

2. Description of the Prior Art

Internal combustion engines of various types have been employed in the prior art, with rotary engine structure indicated in U.S. Pat. Nos. 4,967,707; 4,974,553; 4,949,688; and 4,971,002.

The instant invention attempts to overcome deficiencies of the prior art by employing piston plate structure operative and directed through combustion chambers, with the combustion chambers sealed by an associated chamber plate structure, with each piston plate mounted to a first ring and the chamber plates mounted to a second ring to provide for an equal number of chamber plates and piston plates to provide for an equal predetermined number of plates and pistons relative to the cooperating rings to provide for limited vibration and continuous powering of the combustion engine process, with a minimal of friction loss and lost energy in terms of heat and entropy.

SUMMARY OF THE INVENTION

In view of the foregoing disadvantages inherent in the known types of internal combustion engine structure now present in the prior art, the present invention provides a continuously rotating engine apparatus wherein the same includes orthogonally oriented and intersecting rings of a housing structure to direct closure of combustion chamber of a chamber plate cooperative within a combustion chamber to project a piston plate for energy development. As such, the general purpose of the present invention, which will be described subsequently in greater detail, is to provide a new and improved continuously rotating engine apparatus which has all the advantages of the prior art rotary engine structure and none of the disadvantages.

To attain this, the present invention provides an internal combustion engine including a unitary housing, having a first cylindrical housing medially and orthogonally intersecting a second cylindrical housing, with the first cylindrical housing including a first gear ring rotatably mounted therewithin, with the second cylindrical housing having a second gear ring mounted therewithin, wherein the first gear ring is arranged for simultaneous rotation in communication relative to one another, with the first gear ring having a plurality of spaced piston plates, with the second gear ring including a plurality of spaced chamber plates, wherein the piston plate and the chamber plate are arranged for simultaneous positioning within an associated combustion chamber to effect projection of the piston plate upon combustion within the combustion chamber.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved continuously rotating engine apparatus which has all the advantages of the prior art rotary engine structure and none of the disadvantages.

It is another object of the present invention to provide a new and improved continuously rotating engine apparatus which may be easily and efficiently manufactured and marketed.

It is a further object of the present invention to provide a new and improved continuously rotating engine apparatus which is of a durable and reliable construction.

An even further object of the present invention is to provide a new and improved continuously rotating engine apparatus which is susceptible of a low cost of manufacture with regard to both materials and labor, and which accordingly is then susceptible of low prices of sale to the consuming public, thereby making such continuously rotating engine apparatus economically available to the buying public.

Still yet another object of the present invention is to provide a new and improved continuously rotating engine apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the engine of the invention.

FIG. 2 is an orthographic top view of the invention, taken along the lines 2—2 of FIG. 1 in the direction indicated by the arrows.

FIG. 5 is an orthographic view, taken along the lines 5—5 of FIG. 4 in the direction indicated by the arrows.

FIG. 6 is an orthographic view of the first combustion chamber and associated cooperation of a chamber plate and piston plate structure.

FIG. 7 is an orthographic view, taken along the lines 7—7 of FIG. 6 in the direction indicated by the arrows.

FIG. 8 is an isometric illustration of a piston plate cooperative with a chamber plate during a combustion cycle of the engine structure.

DESCRIPTION OF THE PREFERRED EMBODIMENT

Figure 3:
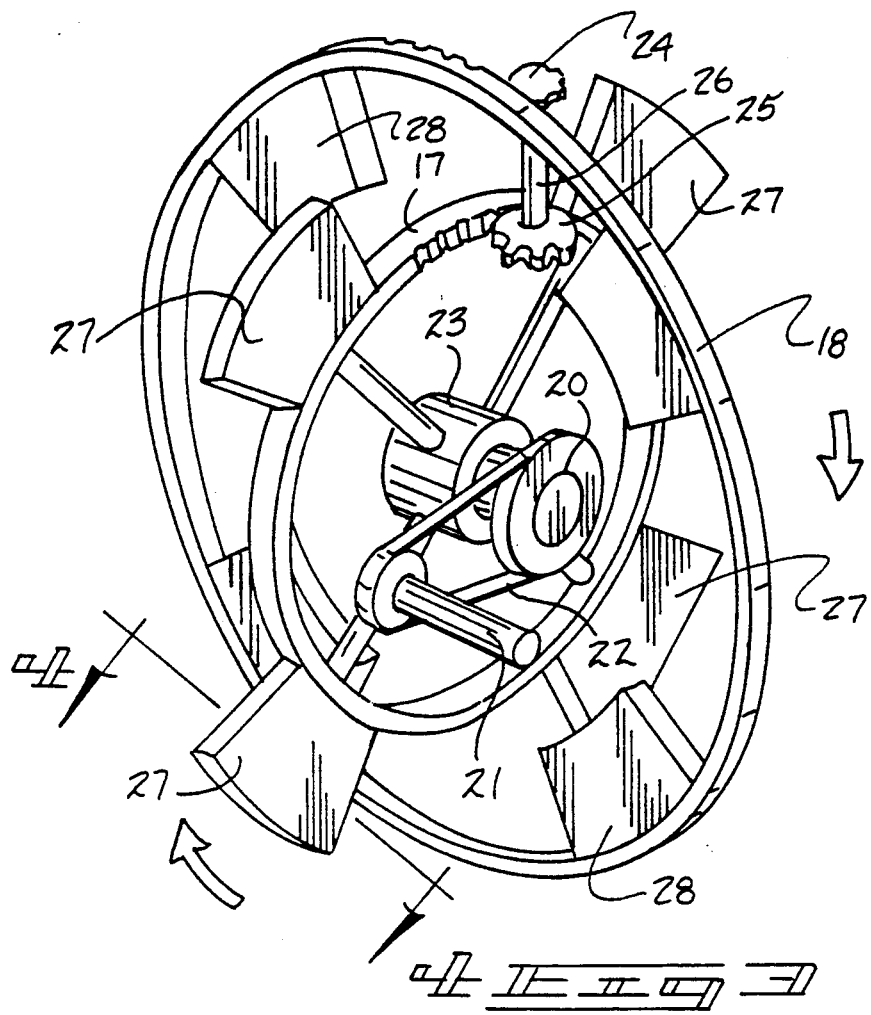
FIG. 3 is an isometric illustration of the first and second gear rings cooperating relative to one another, as well as the piston plate and chamber plate members.
Figure 4:
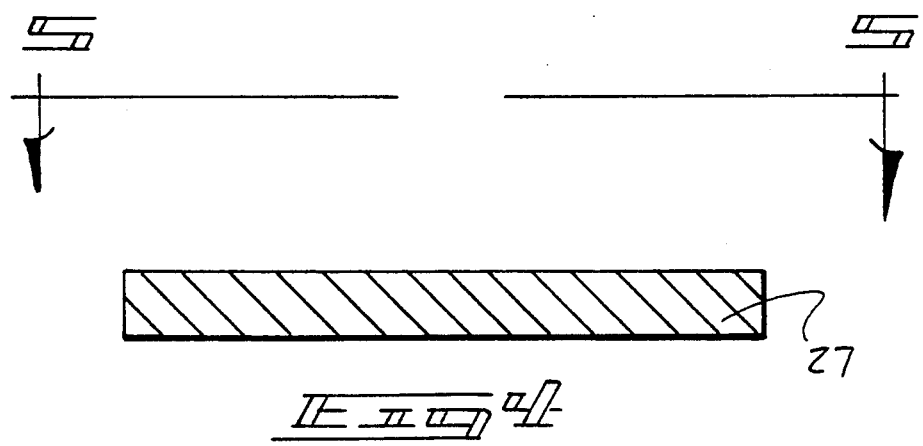
FIG. 4 is an orthographic view, taken along the lines 4—4 of FIG. 3 in the direction indicated by the arrows.

With reference now to the drawings, and in particular to FIGS. 1 to 8 thereof, a new and improved continuously rotating engine apparatus embodying the principles and concepts of the present invention and generally designated by the reference numeral 10 will be described.

More specifically, the continuously rotating engine apparatus 10 of the instant invention essentially comprises a housing 11, having a first cylindrical housing 12 medially of and orthogonally intersecting a second cylindrical housing 13 for creating a unitary housing cavity, with a housing abutment having a first end at the peripheral intersection of the first housing with the second housing, and a second intersection at the peripheral intersection of the first housing and the second housing to include a first combustion chamber 14 at the first intersection, with a second combustion chamber 15 of the second intersection. In communication and in spaced relationship relative to the combustion chambers are respective intake and exhaust ports 31 and 32 on opposed sides of the second cylindrical housing directed through the first cylindrical housing in communication with the associated combustion chamber. The intake port 31 may utilize various intake delivery systems such as fuel injection, carburation, and the like. The exhaust port 32 receives exhausted gas upon the combustion chamber 33 having access to the exhaust port 32 by displacement of a chamber plate 28 relative to the exhaust port 32, in a manner as indicated in FIG. 8 for example.

As indicated in FIG. 1, a drive housing 16 is fixedly mounted to the housing 11, having (see FIG. 3) a first driven shaft 20 driven from a gear housing 23 positioned coaxially of the first gear ring 17 that is rotatably mounted within the first housing 12. A second gear ring 18 operates simultaneously in a rotary manner and in an orthogonal relationship relative to the gear ring, wherein the second gear ring 18 is arranged with a second coupling gear 25 operative through a first coupling gear 24 that are in turn secured together by a shaft 26, whereupon rotation of the first gear ring 17 and the second gear ring 18 are maintained in a timed relationship. It may be understood that a advancing or retarding of the orientation of the piston structure, to be discussed in more detail below, is effected by the passed coupling of the first gear ring 17 relative to the second gear ring 18. The first driven shaft 20 arranged from output of the combustion process mounted to the first gear ring 17 having a plurality of equally spaced piston plate sectors 27 drives the second driven shaft 21 typically through a connecting belt 22. The second gear ring 18 includes an equal plurality of spaced chamber plate sectors. The piston plate sectors and the chamber plate sectors 27 and 28 respectively are phased to bypass one another when oriented relative to an associated combustion chamber, such as a first combustion chamber 14, as indicated in the FIGS. 6 and 8. The equal number of piston plate sectors and chamber plate sectors are indicative of the number of firings that may be effected during a cycle or revolution of each of the gear rings 17 and 18. For purposes of example, a piston plate 27, as indicated in FIG. 8, precedes the positioning of a chamber plate 28 to enclose the combustion chamber 33. The piston plate sector 27 is received within a combustion chamber slot 34 of the combustion chamber to thereby enclose the combustion chamber in cooperation with the timing of the chamber plate sector 28 that encloses the rear wall of the chamber, as the slot 34 is directed through the front wall of the combustion chamber 14. At that instance, timing is effected, typically electronically, to effect firing of the spark plugs 30 to thereby effect a combustion within the combustion chamber 33 subsequent to the introduction of an intake charge directed through the intake port 31 that is positioned within the second cylindrical housing 13 into the rear wall of the combustion chamber that is subsequently closed by the chamber plate sector 28. Combustion projects the piston plate sector 27 rotatably to effect rotation simultaneously of the first gear ring 17, the second gear ring 18, and subsequent driving of the second driven shaft 21.

If desired, a cooling fluid chamber 29 may be positioned within the front and side walls of the combustion chamber as desired and required to effect cooling of the spark plug maintaining prolonged use thereof.

In this manner, back pressure is not introduced into the combustion process through the exhaust port structure 32, and wherein the use of any number of piston plates from one to any convenient number mounted to the respective first gear ring cooperative with an equal number of chamber plates mounted to the second gear ring provides for that number of firings per revolution.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A continuously rotating engine apparatus, comprising,
a housing, the housing have a first cylindrical housing and a second cylindrical housing, the first cylindrical housing and the second cylindrical housing medially and orthogonally intersecting one another, and the first housing having a first housing periphery, the second housing having a second housing periphery, with the first housing periphery and the second housing periphery intersecting at a first intersection and at a second intersection, with a first combustion chamber mounted to the first intersection, and the first combustion chamber including at least one spark plug, and the first cylindrical housing including a first gear ring rotatably mounted within the first cylindrical housing, the second cylindrical housing having a second gear ring rotatably mounted within the second cylindrical housing, and a first coupling gear in geared communication with the first gear ring, and a second coupling gear in geared communication with the second gear ring, and a shaft securing the first coupling gear to the second coupling gear to effect simultaneous rotation of the first gear ring by the second gear ring, with the first gear ring including at least one piston plate sector mounted thereon, and the second gear ring including at least one chamber plate sector mounted thereon, and the combustion chamber having a combustion chamber slot to receive the piston plate sector therethrough, and the combustion chamber having a front wall and side walls, with the chamber plate sector arranged for sealing of a rear wall portion of the combustion chamber subsequent to positioning of the piston plate sector within the slot.

2. An apparatus as set forth in claim 1 wherein the piston plate sector is orthogonally oriented relative to the chamber plate sector.

3. An apparatus as set forth in claim 2 wherein the combustion chamber is positioned in adjacency to the second gear ring adjacent the second housing periphery to effect positioning of the chamber plate in adjacency to the combustion chamber when the piston plate is positioned within the slot.

* * * * *